United States Patent Office

3,703,388
Patented Nov. 21, 1972

3,703,388
HIGH REFRACTIVE INDEX PHOTOCHROMIC GLASSES
Roger J. Araujo, Loris G. Sawchuk, and Thomas P. Seward III, Corning, N.Y., assignors to Corning Glass Works, Corning, N.Y.
No Drawing. Filed Aug. 19, 1970, Ser. No. 65,271
Int. Cl. C03c 3/14, 3/26
U.S. Cl. 106—47 R        7 Claims

ABSTRACT OF THE DISCLOSURE

This invention relates to a family of high refractive index photochromic glasses comprised of lanthanum-borates containing silver halides and exhibiting increased photochromic darkenability and efficient optical bleaching.

---

The co-pending application of L. Randall and T. Seward, Ser. No. 65,270, filed concurrently herewith, entitled Thermally Darkenable Photochromic Glass, discloses a family of lanthanum-borate photochromic glasses which are related to the glasses of the present invention, but which are disinguishable by the fact that they exhibit thermally darkenable behavior.

United States Pat. No. 3,208,860 comprises the basic disclosure concerning photochromic or phototropic glasses, as they have been variously termed. That patent describes glass compositions containing submicroscopic crystals of silver halides dispersed in a glassy matrix, which crytals darken when exposed to ultraviolet radiation and return to their original state when the ultraviolet radiation is removed. This phenomenon displayed by the crystals imparts to the glass the characteristic of reversible darkening dependent upon the amount of actinic radiation incident thereon. This reversibility of optical density was found to be free from fatigue, i.e., the darkening and fading could be undertaken indefinitely with essentially no loss in degree and rate of the reaction between the crystals and the incident radiation.

Whereas Pat. No. 3,208,860 discloses that any inorganic silicate glass containing crystals of silver chloride and/or silver bromide and/or silver iodide will exhibit some photochromic behavior, we have discovered that any of a large family of inorganic lanthanum borate glasses containing submicroscopic crystals of silver chloride and/or silver bromide and/or silver iodide will simmilarly show such behavior.

Further, this family of photochromic glasses includes a large composition range of high refractive index glasses with refractive indices above about 1.6. Such high indices have the advantage that more and larger silver halide crystals may be incorporated in the glasses, giving them higher darkening sensitivities without visible opalescence, than lower index glasses.

Further, most of this family of glasses show the property that relatively large quantities of silver halides can be incorporated into the melt, then precipitated out at lower temperatures. This increased precipitation of the silver halides is accompanied by an increased photochromic darkenability of the glasses.

Further, these photochromic glasses show the property that they can be efficiently bleached from the darkened to the clear state by exposure to visible radiation with wave lengths between about 4000 A. and 7000 A.

One object of this invention is to provide photochromic glasses with a high refractive index. It is a further object of this invention to provide glasses in which the solubility of silver halides is high at high temperatures and low at low temperatures. This temperature dependence of solubility is desirable for it permits introduction of high concentrations of silver halide into the molten host at high temperatures and the subsequent growth of high concentrations of silver halide crystallites at lower temperatures. It is a further object of this invention to provide photochromic glasses with high darkening sensitivities. It is also an object of this invention to provide photochromic glasses with fast optical bleaching characteristics.

The high refractive index host is desirable for several reasons. First, in the manufacture of photochromic fiber optics it is desirable to use a photochromic core glass of as high a refractive index as possible so as to maximize the numerical aperature, or light gathering power of the fiber optic.

Secondly, high index photochromic glasses lead to better resolution than low index glasses when darkened by a divergent light source such as a luminescent phosphor. This is because the angle of divergence of a beam of light is decreased more on entering a piece of high refractive index glass than one of low refractive index.

Thirdly, high refractive index host glasses provide a better index match with the high index silver halide crystallites suspended therein than do low index glasses. This better match allows more and/or larger silver halide crystallites to be present without haze or opalescence resulting from light scattering by the crystallites.

Fourth, since more silver halide may be precipitated as crystallites within a high index glass before haze appears than within a low index glass, increased darkening sensitivity of the glasses can be realized. And finally, since larger silver halide crystallites may be grown before haze appears in high index glasses, the general tendency toward slower fading at larger particle sizes may be used advantageously.

Specifically, our invention comprises photochromic high refractive index lanthanum borate glasses containing microcrystals of at least one silver halide selected from the group consisting of silver chloride, silver bromide, and silver iodide, said microcrystals comprising at least about 0.005% by volume of the glass. These glasses contain, in weight percent, at least about 0.15% Ag, at least one halide in the indicated minimum effective proportion of about 0.1% Cl, about 0.1% Br, and about 0.1% I, and at least about 0.004% CuO.

Such glasses may be obtained by melting a batch for a lanthanum-borate base glass which is potentially photochromic consisting essentially, in weight percent on the oxide basis, as calculated from the batch, of 15–75% $La_2O_3$ and 13–65% $B_2O_3$, to which are added 0.004–0.4% CuO, 0.2–8.0% Ag, and at least one halide selected in the indicated proportion from the group consisting of 0.2–16.0% Cl, 0.2–16.0% Br, and 0.2–0.16% I, where Ag, CuO, and the halides are calculated as amounts in excess of the base glass composition.

Various other additions of compatible oxides may be made to the batch, if desired, to improve the stability of the glass without destroying its photochromic properties as long as the sum of $La_2O_3+B_2O_3$ totals at least 30% by weight of the batch. Such additions may include one or more oxides in the indicated proportions, in weight percent on the oxide basis as calculated from the batch, selected from the group constsing of 0–40% $Ta_2O_5$, 0–40% $Nb_2O_5$, 0–45% $ThO_2$, 0–30% $Al_2O_3$, 0–15% $TiO_2$, 0–15% $ZrO_2$, and 0–30% RO wherein RO consists of one or more of the bivalent metal oxides from the group consisting of ZnO, CdO, CaO, SrO, BaO, MgO, and PbO.

Small quantities of the alkali metal oxides such as $Li_2O$, $K_2O$, $Na_2O$, $Cs_2O$, and $Rb_2O$ may be included in the batch, but the concentration should be kept low (less than 1%) since these components tend to cause opalization. The use of small amounts of other oxides known to be useful in glass compositions, provided they do not adversely affect the photochromic behavior, is not excluded. However, it is preferred that the addition of $SiO_2$ be avoided, although minor amounts (not more than about 10%) may be tolerated, since such additions tend to cause opalization of the glass and loss of photochromic properties.

Although all glasses in the range of compositions specified herein will exhibit some photochromic behavior, it is found that the stability of the glass and the manner and extent of the photochromic behavior depends on certain variables of composition about which some generalizations may be drawn.

First, for any particular system, i.e., combination of components, the useful compositions are limited at high $La_2O_3$ levels by tendencies for the glasses to devitrify on cooling and at low $La_2O_3$ levels by devitrification or by the formation of a two-phase system, the upper limit of $La_2O_3$ being about 75% and the lower limit being about 15%. They are further limited at high $B_2O_3$ levels by a tendency to form two liquid phases in the melt, and at low $B_2O_3$ levels by devitrification, the upper limit of $B_2O_3$ being about 65% and the lower limit about 13%. Limits at high levels of the other components are imposed by a decrease in the useful refractive index of the glass and/or loss of attainable photochromic properties. The maximum upper limits in all cases depend on the specific system being considered.

Second, there is no upper limit to the amount of silver or halogen which can be added to the batch; however, due to the finite solubility of silver halides in the melt there is little benefit to exceeding about 3% of either, except to overcome volatilization during melting. Even then, there seems to be little benefit gained by exceeding about 4% silver and about 12% halide, and the concentration of either in the end-product glass probably does not exceed about 3.0% by weight.

Third, small amounts of CuO act ts a very effective sensitizer for photochromic darkening. A range of from 0.004% to 0.4% CuO has been found effective. Quantities in the range from 0.016%–0.128% are preferred, with the upper limits most useful at high silver halide concentrations.

Fourth, small quantities of Se and Cd have been found helpful as sensitizers to darkening in silicate photochromic glasses. Both can be added to the glasses of this invention. Cd seems to be especially effective in sensitizing photochromic darkening in glasses of this invention at the highest silver halide levels. For this purpose, compositions wherein CdO is present in an amount ranging between about 0.1–30% by weight are suitable.

Fifth, in silicate-based photochromic glasses, additions of certain low-temperature reducing agents from the group comprising $SnO_2$, FeO, $As_2O_3$, and $Sb_2O_3$ have been found helpful to the photochromic properties. Similarly, small quantities of these components can be added to our glasses.

Sixth, fluorine and $P_2O_5$ may be added to the glass batch to improve its melting qualities and to inhibit devitrification on cooling. The effect of fluorine upon the photochromism of the glass is not completely known but the amount utilized is kept low in order to forestall the precipitation of fluorides within the glass. The $P_2O_5$ content is also held low so that its action as an oxidation agent will be minimized.

Seventh, the presence of the alkaline earth oxides, CaO, SrO, and BaO, tends to increase the rate of thermal fading of the darkened state. If slow thermal fade is desired the concentrations of these components should be minimized.

Examples of glasses having the potential of being made photochromic after suitable heat treatment thereof are set forth in Table I on a weight percent basis as calculated from the batch. In accordance with conventional practice the halogen, silver, and other trace ingredients used as sensitizers are expressed in percent by weight in excess of the total glass composition in which the sum of the constituents listed other than the aforementioned totals approximately 100%.

TABLE I

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| $B_2O_3$ | 24.5 | 39.2 | 29.2 | 24.6 | 22.1 | 27.0 | 29.5 | 21.3 | 24.9 | 23.6 | 24.9 | 22.0 | 24.9 | 27.1 | 34.6 | 32.2 | 37.0 | 36.9 | 37.0 | 39.5 |
| $La_2O_3$ | 48.9 | 59.0 | 54.0 | 44.1 | 46.7 | 41.8 | 44.1 | 49.6 | 39.9 | 47.7 | 39.7 | 51.4 | 34.7 | 57.0 | 54.6 | 47.1 | 56.5 | 51.8 | 41.9 | 49.5 |
| CdO | 1.1 | 1.1 | 1.1 | 1.1 | 1.1 | 1.1 | 1.1 | 0.7 | 0.1 | 1.0 | 0.1 | 1.0 | 0.1 | 0.6 | 0.6 | 0.6 | 1.3 | 1.3 | 1.3 | 10.7 |
| ZnO | | | | | | | | | | | | | | | | | | | | |
| CaO | | | | | | | | | | | | | | | | | | | | |
| $SiO_2$ | | | | | | | | 3.8 | | | | 5.0 | | | | | | | | |
| SrO | | | | | | | | | | | | | | | | | | | | |
| BaO | | | | | | | | | | | | | | | | | | | | |
| $ThO_2$ | | | | | | | | | | | | | | | | | 4.9 | 9.7 | 19.5 | |
| $Al_2O_3$ | 1.0 | 0.7 | 0.8 | 0.7 | 0.7 | 0.7 | 0.7 | 1.0 | 15.2 | 4.1 | 10.4 | 1.0 | 10.0 | 0.3 | 0.3 | 0.3 | 0.3 | 0.3 | 0.3 | 0.3 |
| $Nb_2O_5$ | | | | | | | | | | | | | | 5.0 | 9.9 | 19.8 | | | | |
| $Ta_2O_5$ | 24.5 | | 4.9 | 29.5 | 29.4 | 29.4 | 24.6 | 23.6 | 19.9 | 23.6 | 24.9 | 24.6 | 24.9 | | | | | | | |
| $Na_2O$ | | | | | | | | | | | | | 0.4 | | | | | | | |
| $As_2O_3$ | | | | | | | | | | | | | | | | | | | | |
| Ag | 0.75 | 0.75 | 0.75 | 0.75 | 0.75 | 0.75 | 0.75 | 0.75 | 1.00 | 0.75 | 1.00 | 0.75 | 1.00 | 0.75 | 0.75 | 0.75 | 0.75 | 0.75 | 0.75 | 0.50 |
| Cl | 0.75 | 0.50 | 0.50 | 0.50 | 0.50 | 0.50 | 0.50 | 0.30 | 1.00 | 0.50 | 1.00 | 0.30 | | 0.30 | 0.30 | 0.30 | 0.75 | 0.75 | 0.75 | 0.50 |
| Br | | | | | | | | | | | | | 0.30 | 0.50 | | | | | | |
| I | | | | | | | | | | | | 0.30 | | | | | | | | |
| F | 0.50 | 0.50 | 0.50 | 0.50 | 0.50 | 0.50 | 0.50 | 0.50 | 0.50 | | 0.50 | 0.50 | 0.50 | | | | | | | |
| CuO | 0.032 | 0.032 | 0.032 | 0.032 | 0.032 | 0.032 | 0.032 | 0.032 | 0.064 | 0.032 | 0.064 | 0.032 | 0.064 | 0.032 | 0.032 | 0.032 | 0.032 | 0.032 | 0.032 | 0.032 |
| Se | | | | | | | | | | 0.03 | | 0.05 | | 0.05 | | | | | | |

| | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|
| $B_2O_3$ | 44.2 | 29.5 | 36.9 | 34.4 | 39.3 | 44.5 | 29.5 | 39.5 | 17.2 | 16.3 | 21.6 | 29.2 | 32.3 | 34.3 | 33.3 | 29.9 | 41.4 | 39.2 | 38.4 | 15.1 |
| $La_2O_3$ | 49.3 | 49.3 | 56.6 | 54.1 | 54.2 | 44.5 | 59.1 | 49.4 | 21.1 | 20.0 | 50.5 | 51.6 | 45.4 | 42.9 | 41.6 | 59.9 | 41.4 | 43.7 | 48.1 | 18.6 |
| CdO | 5.8 | 20.9 | 1.3 | 1.3 | 1.3 | 0.9 | 0.8 | 0.9 | 0.2 | 0.2 | 2.4 | 9.7 | 12.4 | 21.0 | 22.3 | | 6.6 | 6.6 | 3.4 | 6.5 |
| ZnO | | | 4.9 | 9.9 | 4.9 | | | | | 4.8 | | | | | | 9.9 | | | | 4.4 |
| CaO | | | | | | 9.8 | | | | | | | | | | | 8.2 | | | |
| $SiO_2$ | | | | | | | | | | | | | | | | | | | | |
| SrO | | | | | | | 9.9 | | | | | | | | | | | 9.1 | | |
| BaO | | | | | | | | 9.9 | | | | | | | | | | | 9.6 | |
| $ThO_2$ | | | | | | | | | 30.3 | 28.5 | | | 8.6 | | | | | | | 26.6 |
| $Al_2O_3$ | 0.7 | 0.3 | 0.3 | 0.3 | 0.3 | 0.3 | 0.3 | 0.7 | 2.1 | 2.5 | 1.5 | 0.5 | 1.3 | 1.8 | 2.8 | 0.3 | 1.4 | 1.4 | 0.5 | 3.1 |
| $Nb_2O_5$ | | | | | | | | | | | 15.1 | 14.4 | | 9.0 | | | | | | 13.3 |
| $Ta_2O_5$ | | | | | | | | | 12.0 | 11.4 | 24.0 | | | | | | | | | 10.6 |
| $Na_2O$ | | | | | | | | | | | | | | | | | | | | |
| $As_2O_3$ | | | | | | | | | 2.0 | 1.9 | | | | | | | | | | |
| Ag | 0.75 | 0.75 | 0.75 | 0.75 | 0.75 | 0.75 | 0.75 | 0.50 | 1.00 | 0.80 | 3.9 | 3.7 | 3.5 | 3.5 | 3.4 | 2.0 | 3.7 | 2.7 | 2.0 | 4.5 |
| Cl | 0.50 | 0.75 | 0.75 | 0.75 | 0.75 | 0.50 | 0.50 | 0.50 | 1.00 | 0.80 | 5.8 | 5.4 | 6.5 | 6.8 | 10.0 | 3.8 | 5.5 | 5.5 | 1.9 | 7.0 |
| Br | | | | | | | | | | | | | | | 10.0 | | | | | |
| I | | | | | | | | | | | | | | | | | | | | |
| F | 0.50 | | | | | | | 0.50 | | 0.50 | 0.50 | 0.5 | | | 0.9 | 0.8 | | | | 0.4 |
| CuO | 0.032 | 0.032 | 0.032 | 0.032 | 0.032 | 0.032 | 0.032 | 0.032 | 0.016 | 0.016 | 0.06 | 0.06 | 0.06 | 0.11 | 0.06 | 0.03 | 0.06 | 0.06 | 0.06 | 0.06 |
| Se | | | | | | | | | 0.05 | 0.05 | | | | | | | | | | |

As is well known, halides are prone to volatilize during the melting process and such losses can exceed 50% of the amount added to the batch depending on the melting temperature and time, the type of melting unit employed, and the concentration of halide in the melt. Likewise, silver can also be lost from the batch during melting, probably due to volatilization of silver halide, but the amount lost is only on the order of 20% of that added.

Further, at the melting temperatures of these glasses there is a finite solubility of the silver halides in the melt. Generally, for the glasses here considered, this limit is between about 1.5% and 3.0%. Any silver halide added to the batch in excess of these quantities will not go into the glass, and will form a silver halide-rich liquid layer in the melt which will volatilize off given sufficient time.

Consequently, concentrations of silver and the halide, as calculated from the batch, cannot be taken as the concentration found in the end product glass. However, for any particular set of circumstances, one can readily adjust the batch composition to compensate for losses, and the wide latitude in the permissible amounts of such essential ingredients makes it possible to utilize rough approximation for this purpose and still produce the desired article. Further, by maintaining excess silver halide as a second liquid phase in the melting step, the concentration of silver halide in the melt can be maintained near its maximum level when desired.

Glasses of the above compositions are processed in accordance with conventional glass-making practice of weighing out standard batch materials, dry ball milling or tumble mixing the batch, and melting in a non-reducing atmosphere at temperatures between 1200°–1400° C. for times varying between one to eight hours. They are then cooled to a glass and annealed at about 550°–650° C. In some cases the resulting glasses are photochromic, but, generally, heat treatments at 600°–800° C., or sometimes higher, are required to properly develop their photochromic characteristics.

As has been explained above, the photochromism of these glasses is due to the presence of submicroscopic crystals of silver halides dispersed in the glassy matrix. These crystals can be produced by cooling the melt relatively slowly, but this procedure often leads to a non-uniform development of the photochromic properties, and at silver halide concentrations in excess of about 1%, generally leads to an opalescence of the glass. This opalescence results from significant numbers of silver halide particles growing to a size which will efficiently scatter light. The tendency for opalescence on cooling high-index glasses is less than that in the lower-index glasses of Pat. No. 3,208,860, but at high silver halide levels (>1.5%) is still sufficient to render the glass opaque. More accurate control over the size and uniformity of the submicroscopic crystals is obtained when the melt is cooled rapidly to a glass such that essentially no silver halide crystallites, or an insignificant size and number of them, are formed. The glass is then heated to a temperature above the strain point thereof for a sufficient length of time to cause the precipitation of the silver halide within the glass in an amount of at least 0.005% by volume.

For compositions containing silver halides in amounts less than about 1%, sufficiently rapid cooling can be accomplished by such a technique as pouring the melt onto a steel plate. At higher silver halide levels of about 1–1.5%, the thickness of the poured glass should not exceed about ¼", or it should be formed by drawing through metal rollers into sheets not in excess of about ¼" thick. At silver halide concentrations in excess of about 1.5%, even more rapid cooling is required. Such rapid cooling may be achieved, for example, by pouring the melt through metal rollers to form sheets about 0.005% thick. Procedures for rapidly quenching photochromic glasses and the methods by which the particle size of the silver halide may be controlled during a subsequent heat treatment are described in detail in U.S. Pat. No. 3,449,103.

The rapidly cooled glasses may then be annealed and subsequently heat treated to precipitate the silver halide particles and develop their photochromic properties. Normally, temperatures in excess of the softening point of the glass are not employed in the precipitation step inasmuch as such treatment would cause deformation of the glass article. In general, temperatures of about 600°–800° C. are useful in this practice for times of about ¼–8 hours. The lower temperatures of heat treatment are generally required to prevent deformation with high levels of bivalent metal oxides (listed above as RO) are involved.

Table II lists some of the glass forming procedures and heat treating schedules found useful in developing the photochromic characteristics of some of the glasses of Table I.

TABLE II

Forming method:
(A) _____ Poured on cold steel slab.
(B) _____ Poured between water-cooled rollers.

Heat treatment:
(a) _____ ½ hour at 700° C.
(b) _____ 1 hour at 700° C.
(c) _____ ½ hour at 725° C.
(d) _____ 1 hour at 725° C.
(e) _____ ½ hour at 750° C.
(f) _____ 1 hour at 750° C.

The change in transmission of visible radiation caused by exposing the glasses so prepared, having thicknesses between 0.1–6 mm., to actinic radiation, having wave lengths of from about 3000 A. to 4500 A., is measured in accordance with conventional practice. It is first measured before exposure to any appreciable amount of actinic radiation, and then the decrease in transmission is measured continuously in the same manner as the glass is exposed to ultraviolet radiation (3650 A.) produced by a commercial "Mineralite" long-wave ultraviolet lamp having a 9-watt input, the output being distributed over an area of about 4 square inches. The measurement of the increase in darkening is continued for five minutes. While in almost all cases saturation darkening has not occurred within this time, the transmission after five minutes of exposure ($T_{D5}$) as compared to the initial transmission ($T_0$) is an effective means of determining the relative darkenability of the glasses. The fading rate is then determined by removing the actinic radiation from the surface of the glass by means of a commercial cutoff filter opaque to radiation below 5000 A. and continuing to record the transmission of the glass for an additional interval of 5 minutes. While in no case has complete fading occurred within 5 minutes, the transmission after 5 minutes of fading ($T_{F5}$) as compared to the transmission of the darkened state ($T_{D5}$) is an effective means of determining the relative fading characteristics of the glasses. Table III shows the darkening and fading characteristics discussed above for the group of compositions listed in Table I and subjected to the forming and heat treatment schedules listed in Table II.

The optical bleaching efficiency of the glasses is tested by measuring the change in transmission of visible radiation caused by exposing the already darkened glass to visible radiation. The glass transmission is measured after 5 minute exposure to actinic radiation ($T_{D5}$). Thereafter the glass is exposed for 30 seconds to visible radiation produced by a 250-watt industrial infrared reflector flood lamp at a distance of 10 inches, the radiation reaching the glass being filtered to remove ultraviolet actinic radiation by means of the above discussed commercial cutoff filter opaque to radiation below 5000 A., and the transmission again measured. Since, in all cases, complete bleaching has not occurred within 30 seconds, the transmission after 30 seconds (0.5 minute) of bleaching ($T_{B.5}$) as compared to the transmission of the darkened state ($T_{D5}$) is an effective means of determining the relative bleaching characteristics of the glasses. $T_{B.5}$ for the group of example glasses considered is also contained in Table III.

TABLE III

| Example | Forming method | Treatment | Thickness, mm. | $T_o$ | $T_{D5}$ | $T_{F5}$ | $T_{B.5}$ |
|---|---|---|---|---|---|---|---|
| 1 | A | f | 4.5 | 81 | 17 | 22 | 35 |
| 2 | A | b | 4.5 | 83 | 18 | 20 | 41 |
| 3 | A | b | 4.6 | 83 | 24 | 28 | 40 |
| 4 | A | f | 4.2 | 73 | 18 | 22 | 43 |
| 5 | A | f | 4.5 | 44 | 11 | 14 | 22 |
| 6 | A | f | 4.2 | 80 | 22 | 28 | 47 |
| 7 | A | f | 4.3 | 79 | 16 | 19 | 36 |
| 8 | A | d | 5.2 | 80 | 21 | 23 | 58 |
| 9 | A | e | 6.1 | 49 | 18 | 21 | 31 |
| 10 | A | f | 5.8 | 78 | 16 | 20 | 38 |
| 11 | A | e | 2.0 | 82 | 30 | 36 | 63 |
| 12 | A | e | 4.8 | 83 | 36 | 40 | 52 |
| 13 | A | e | 5.8 | 61 | 30 | 39 | 41 |
| 14 | A | b | 4.1 | 75 | 28 | 30 | 54 |
| 15 | A | b | 4.9 | 75 | 29 | 32 | 53 |
| 16 | A | b | 3.5 | 56 | 33 | 30 | 52 |
| 17 | A | d | 4.1 | 80 | 19 | 25 | 35 |
| 18 | A | d | 4.0 | 76 | 20 | 25 | 42 |
| 19 | A | d | 4.8 | 81 | 40 | 49 | 61 |
| 20 | A | b | 4.0 | 70 | 11 | 13 | 17 |
| 21 | A | d | 4.2 | 72 | 25 | 30 | 44 |
| 22 | A | d | 4.4 | 70 | 15 | 18 | 26 |
| 23 | A | b | 4.4 | 78 | 16 | 18 | 34 |
| 24 | A | d | 4.6 | 73 | 14 | 17 | 27 |
| 25 | A | d | 5.4 | 79 | 15 | 18 | 34 |
| 26 | A | d | 4.4 | 82 | 19 | 25 | 38 |
| 27 | A | b | 4.3 | 76 | 39 | 47 | 52 |
| 28 | A | d | 4.4 | 75 | 25 | 33 | 37 |
| 29 | A | f | 4.4 | 80 | 61 | 65 | 72 |
| 30 | A | f | 5.5 | 75 | 59 | 63 | 69 |
| 31 | B | f | 0.18 | 84 | 50 | 53 | 62 |
| 32 | B | d | 0.27 | 89 | 52 | 56 | 67 |
| 33 | B | d | 0.15 | 88 | 55 | 59 | 66 |
| 34 | B | a | 0.19 | 87 | 34 | 39 | 49 |
| 35 | B | d | 0.25 | 88 | 49 | 53 | 63 |
| 36 | B | c | 0.22 | 88 | 60 | 66 | 73 |
| 37 | B | c | 0.17 | 88 | 49 | 54 | 65 |
| 38 | B | c | 0.15 | 77 | 31 | 36 | 49 |
| 39 | B | c | 0.15 | 89 | 55 | 62 | 73 |
| 40 | B | c | 0.25 | 84 | 50 | 54 | 69 |

Among the high-refractive-index lanthanum-borate glasses which are preferred for their excellent photochromic properties are those consisting essentially, in weight percent on the oxide basis as calculated from the batch, of 45–65% $La_2O_3$, 25–45% $B_2O_3$, at least 70% $La_2O_3+B_2O_3$, 0–30% $Ta_2O_5$. 0–30% $Nb_2O_5$, 0–25% $ThO_2$, and 3–25% RO, wherein RO consists of one or more of the bivalent metal oxides selected from the group consisting of ZnO, CdO, SrO, BaO, MgO, and PbO, to which are added, as calculated in excess of the base glass composition, 0.016–0.128% CuO, 0.3–4.0% Ag, and 0.2–12% Cl.

We claim:

1. A photochromic article comprising a lanthanum-borate glass body consisting essentially of in weight percent on the oxide basis, 15–75% $La_2O_3$, 13–65% $B_2O_3$, and at least 30% $La_2O_3+B_2O_3$, said body having in at least a portion thereof microcrystals of at least one silver halide selected from the group consisting of silver chloride, silver bromide, and silver iodide, the concentration of said crystals in said portion being at least about 0.005% by volume and said portion containing in weight percent at least 0.15% Ag, at least 0.004% CuO, and at least one halide in the indicated minimum effective propotrion of 0.1% Cl, 0.1% Br, and 0.1% I.

2. The photochromic article of claim 1 wherein said portion of said lanthanum-borate glass body contains, in weight percent, not more than about 3.0% Ag, 3.0% Cl, 3.0% Br, 3.0% I, and 0.4% CuO.

3. A composition for a high refractive index lanthanum-borate glass which is potentially photochromic consisting essentially, in weight percent on the oxide basis as calculated from the batch, of 15–75% $La_2O_3$ and 13–65% $B_2O_3$, to which are added, based upon the total weight of the base glass composition, 0.004–0.4% CuO, 0.2–8.0% Ag, and at least one halide in the indicated proportion selected from the group consisting of 0.2–16.0% Cl, 0.2–16.0% Br, and 0.2–16.0% I.

4. A composition according to claim 3 wherein $La_2O_3+B_2O_3$ totals at least 30% by weight of the batch, which optionally contains, in weight percent on the oxide basis as calculated from the batch, additions of one or more oxides selected in the indicated proportions from the group consisting of 0–40% $Ta_2O_5$, 0–40% $Nb_2O_5$, 0–45% $ThO_2$, 0–30% $Al_2O_3$, 0–15% $TiO_2$, 0–15% $ZrO_2$, and 0–30% RO, wherein RO consists of one or more divalent metal oxides selected from the group consisting of ZnO, CdO, CaO, SrO, BaO, MgO, and PbO.

5. A composition according to claim 4 which consists essentially, in weight percent on the oxide basis as calculated from the batch, of 45–65% $La_2O_3$, 25–45% $B_2O_3$, at least 70% $La_2O_3+B_2O_3$, 0–30% $Ta_2O_5$, 0–30% $Nb_2O_5$, 0–25% $ThO_2$, and 3–25% RO, wherein RO consists of one or more of the bivalent metal oxides selected from the group consisting of ZnO, CdO, SrO, BaO, MgO, and PbO, to which are added, as calculated in excess of the base glass composition, 0.016–0.128% CuO, 0.3–4.0% Ag, and 0.2–12% Cl.

6. A composition according to claim 4 wherein CdO is present in an amount ranging between about 0.1–30% by weight.

7. A composition according to claim 4 wherein CuO is added in an amount ranging between about 0.016–0.128% by weight based upon the total weight of the base glass composition.

References Cited

UNITED STATES PATENTS

| | | | |
|---|---|---|---|
| 3,208,860 | 9/1965 | Armistead et al. | 106—52 |
| 3,486,915 | 12/1969 | Bromer et al. | 106—47 R |

FOREIGN PATENTS

| | | | |
|---|---|---|---|
| 1,924,493 | 2/1970 | Germany | 106—52 |
| 2,008,809 | 1/1970 | France | 106—Dig. 6 |

JAMES E. POER, Primary Examiner

M. L. BELL, Assistant Examiner

U.S. Cl. X.R.

106—Dig. 6; 350—160 P